United States Patent
Matanie et al.

(10) Patent No.: US 11,362,915 B2
(45) Date of Patent: Jun. 14, 2022

(54) DISTRIBUTED COMPUTING SYSTEM FOR INTENSIVE VIDEO PROCESSING

(71) Applicant: Everseen Limited, Blackpool (IE)

(72) Inventors: Norbert Matanie, Arad (RO); Serban Maduta, Oradea (RO); Bogdan Ciubotaru, Donoughmore (IE)

(73) Assignee: Everseen Limited, Blackpool (IE)

( * ) Notice: Subject to any disclaimer, the term of this patent is extended or adjusted under 35 U.S.C. 154(b) by 162 days.

(21) Appl. No.: 17/012,206

(22) Filed: Sep. 4, 2020

(65) Prior Publication Data

US 2021/0075708 A1  Mar. 11, 2021

Related U.S. Application Data

(60) Provisional application No. 62/896,661, filed on Sep. 6, 2019.

(51) Int. Cl.
| | |
|---|---|
| *H04L 43/00* | (2022.01) |
| *H04L 43/08* | (2022.01) |
| *G06N 3/02* | (2006.01) |
| *H04L 43/16* | (2022.01) |
| *H04L 65/80* | (2022.01) |
| *H04N 7/18* | (2006.01) |
| *G06V 20/52* | (2022.01) |

(52) U.S. Cl.
CPC ............ *H04L 43/08* (2013.01); *G06N 3/02* (2013.01); *G06V 20/52* (2022.01); *H04L 43/16* (2013.01); *H04L 65/80* (2013.01); *H04N 7/181* (2013.01)

(58) Field of Classification Search
CPC ......... H04L 43/08; H04L 43/16; H04L 65/80; G06V 20/52; G06N 3/02; H04N 7/181
See application file for complete search history.

(56) References Cited

U.S. PATENT DOCUMENTS

| | | | |
|---|---|---|---|
| 7,680,938 B2 * | 3/2010 | Oesterreicher | ..... H04L 67/1002 709/226 |
| 9,900,359 B2 | 2/2018 | Sharma et al. | |
| 2009/0272801 A1 | 11/2009 | Connell, II et al. | |

(Continued)

FOREIGN PATENT DOCUMENTS

| | | |
|---|---|---|
| CN | 111193788 A | 5/2020 |
| GB | 2576382 A | 2/2020 |
| WO | 2006105376 A2 | 10/2006 |

*Primary Examiner* — Khai M Nguyen
(74) *Attorney, Agent, or Firm* — Young Basile Hanlon & MacFarlane, P.C.

(57) ABSTRACT

A method for distributing load in a network of processing nodes, wherein the network includes a requesting node, and a set of external processing nodes. The method includes sending an Internet Control Message Protocol (ICMP) message to each external processing node, classifying each external processing node as being either a responding or a non-responding node based on its response time, identifying a responding node that has the capability to fulfill a video processing request, determining first and second sets of excluded responding nodes, selecting the identified node for fulfilling the video processing request, when the identified node does not form a part of the first and second sets of excluded responding nodes, sending a transmission package from the requesting node to the selected identified node for processing, and receiving a binary response from the selected node.

20 Claims, 4 Drawing Sheets

(56) References Cited

U.S. PATENT DOCUMENTS

2013/0326044 A1* 12/2013 Maldaner ................ H04L 41/00
  709/223
2018/0129892 A1* 5/2018 Bahl ...................... G06V 20/54
2019/0236363 A1 8/2019 Bacelis et al.

* cited by examiner

DISTRIBUTED COMPUTING SYSTEM FOR INTENSIVE VIDEO PROCESSING

This application claims the benefit of U.S. Provisional Patent Application No. 62/896,661, filed on Sep. 6, 2019, the contents of which are incorporated by reference herein in their entirety.

TECHNICAL FIELD

The present disclosure relates to creation of a distributed computing system that would enable distributed video stream processing, and more specifically to load sharing in a network of distributed nodes.

BACKGROUND

In a retail store, ticket switching is a fraudulent activity in which a fraudster switches a barcode or price ticket on a first item with that of a cheaper item. Generally, the retail store employs a camera that is configured to record and store images of products within the retail store, and a video processor that is configured to process the video footage to determine any ticket switching activity in the retail store. The video processor facilitates automated detection and deterrence of the ticket switching activity by determining if a barcode on an item within a camera view (i.e. person's hand) matches the barcode expected of the item.

However, computational resources in the video processor may be insufficient to handle new workloads that serve new and more advanced capabilities desired. At the same time, computation resources might be available in other external computing systems connected via a network to the video processor.

In view of the above, there is a need for a method and system that enables load distribution in the network of processing nodes, for automatic detection of ticket switching activity in a retail store.

SUMMARY

According to an aspect of the present disclosure, there is provided a method for distributing load in a network of processing nodes, wherein the network includes a requesting node, and a set of external processing nodes. The method includes sending an Internet Control Message Protocol (ICMP) message to each external processing node, and classifying each external processing node as being either a responding or a non-responding node based on the corresponding response time of each ICMP message. The method may further include identifying a responding node that has the capability to fulfill a video processing request submitted by the requesting node, and determining a first set of excluded responding nodes, wherein the computational load on each excluded responding node of the first set during a first pre-defined time interval exceeds a first threshold. The method may further include determining a second set of excluded responding nodes, wherein a number of video processing requests received by each excluded responding node of the second set from the requesting node during a preceding time interval exceeds a second threshold, and selecting the identified node for fulfilling the video processing request, when the identified node does not form a part of the first and second sets of excluded responding nodes. The method may further include sending a transmission package from the requesting node to the selected identified node for processing, and receiving a binary response from the selected identified node.

According to another aspect of the present disclosure, there is provided a system that includes a camera configured to record a video footage, a requesting node communicatively coupled to the camera and configured to receive the video footage for processing, and a set of external processing nodes communicatively coupled to the requesting node. The system further includes a load distribution server communicatively coupled to the requesting node and the set of external processing nodes and comprising a processor. The processor is configured to send an Internet Control Message Protocol (ICMP) message to each external processing node, classify each external processing node as being either a responding or a non-responding node based on the corresponding response time of each ICMP message, identify a responding node that has the capability to fulfill a video processing request submitted by the requesting node, determine a first set of excluded responding nodes, wherein the computational load on each excluded responding node of the first set during a first pre-defined time interval exceeds a first threshold, determine a second set of excluded responding nodes, wherein a number of video processing requests received by each excluded responding node of the second set from the requesting node during a preceding time interval exceeds a second threshold, select the identified node for fulfilling the video processing request, when the identified node does not form a part of the first and second sets of excluded responding nodes, send a transmission package to the selected identified node for processing, and receive and transmit a binary response to the requesting node.

According to yet another aspect of the present disclosure, there is provided a non-transitory computer readable medium configured to store a program causing a computer to distribute load in a network of processing nodes, wherein the network includes a requesting node, and a set of external processing nodes. The program is configured to send an Internet Control Message Protocol (ICMP) message to each external processing node, classify each external processing node as being either a responding or a non-responding node based on the corresponding response time of each ICMP message, identify a responding node that has the capability to fulfill a video processing request submitted by the requesting node, determine a first set of excluded responding nodes, wherein the computational load on each excluded responding node of the first set during a first pre-defined time interval exceeds a first threshold, determine a second set of excluded responding nodes, wherein a number of video processing requests received by each excluded responding node of the second set from the requesting node during a preceding time interval exceeds a second threshold, select the identified node for fulfilling the video processing request, when the identified node does not form a part of the first and second sets of excluded responding nodes, send a transmission package to the selected identified node for processing, and receive and transmit a binary response to the requesting node.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure. Further, the terms and phrases used herein are not intended to be limiting but rather to provide an understandable description of the disclosure.

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
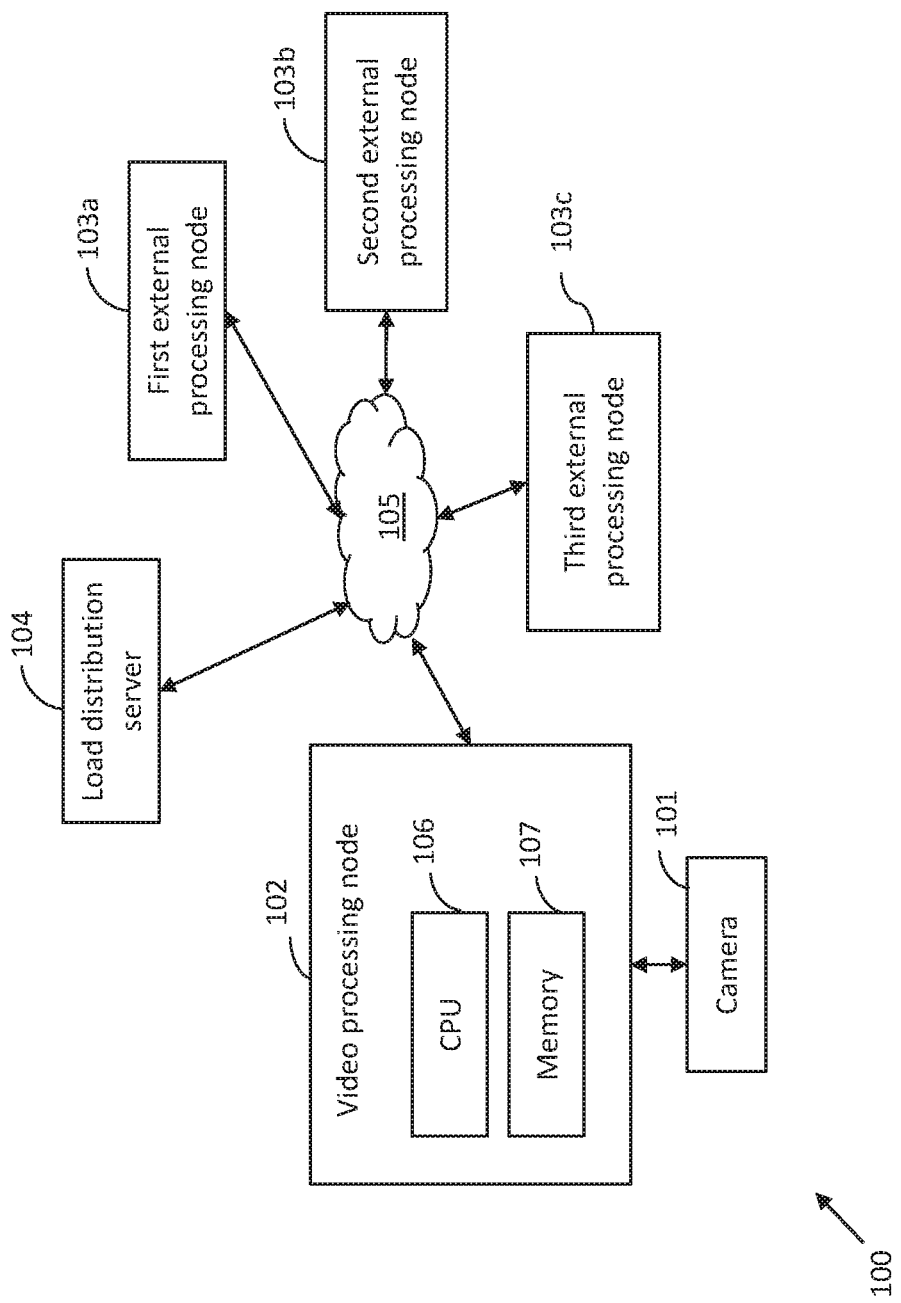
FIG. 1 illustrates an environment, wherein various embodiments of the present disclosure can be practiced.

FIG. 1 illustrates an environment 100, wherein various embodiments of the present disclosure can be practiced. The environment 100 includes a camera 101, a video processing node 102, first through third external processing nodes 103a till 103c, and a load distribution server 104, each communicatively coupled to each other through a communication network 105.

The camera 101 is configured to capture and store video footage of one or more objects in real-time, especially in a retail store. In an embodiment of the present disclosure, the camera 101 is configured to capture one or more items of video footage of a retail check out process including a Self-check out system (SCO). Optionally, the camera 101 includes, but not limited to, an Internet protocol (IP) camera, a Pan-Tilt-Zoom (PTZ) camera, a thermal image camera or an Infrared camera.

The video processing node 102 includes a central processing unit (CPU) 106, and a memory 107. The CPU 106 is a processor, computer, microcontroller, or other circuitry that controls the operations of various components, and may execute software, firmware, and/or other instructions, for example, that are stored on a volatile or non-volatile memory, such as the memory, or otherwise provided to the CPU 106. The CPU 106 may be connected to the memory 107, through wired or wireless connections, such as one or more system buses, cables, or other interfaces.

The memory 107, in addition to storing instructions and/or data for use by the CPU 106 in managing the operation of the camera 101, may also include user information associated with one or more users of the camera 101. For example, the user information may include authentication information (e.g. username/password pairs), user preferences, and other user-specific information. The CPU 106 may access this data to assist in providing control functions (e.g. transmitting and/or receiving one or more control signals) related to the operation of the memory 107.

The communication network 105 may be any suitable wired network, wireless network, a combination of these or any other conventional network, without limiting the scope of the present disclosure. Examples may include a Local Area Network (LAN), wireless LAN connection, an Internet connection, a point-to-point connection, or other network connection and combinations thereof.

In an embodiment of the present disclosure, the camera 101 is configured to record and store video footage of products within the retail store and the video processing node 102 is configured to process the video footage to detect any ticket switching activity in the retail store. Ticket switching is a fraudulent activity in which a fraudster switches a barcode or price ticket on a first item with that of a cheaper item. The video processing node 102 facilitates automated detection and deterrence of ticket switching activity by determining if a barcode on an item carried by a user, matches the barcode expected of the item. In an embodiment of the present disclosure, the video processing node 102 is configured to automatically detect ticket switching activity in the retail store using pre-trained Machine Learning (ML) algorithms.

In an embodiment of the present disclosure, each of the first through third external processing nodes 103a till 103c is configured to facilitate the processing of video footage captured by the camera 101, when the corresponding video processing node 102 does not have requisite image processing capabilities. Thus, the excess processing capability of the first through third external processing nodes 103a till 103c is used to share the processing load of the video processing node 102. It may be noted, that the Machine Learning algorithm implemented by the video processing node 102 is computationally demanding. Therefore, a single video processing node 102 is unable to undertake all of the necessary processing for a set of video sequences. The video processing node 102 is considered to be under heavy load, when its CPU and/or GPU usage exceeds 80%. Internet Control Message Protocol (ICMP) is an error-reporting protocol that network devices like routers use to generate error messages to a source Internet Protocol (IP) address when network problems prevent delivery of IP packets. In the present case, ICMP responses from the video processing node 102 can be customized with its current time performance metrics such as Central Processing Unit (CPU) and/or Graphics Processing Unit (GPU) usage.

Further, a specific constraint on the image processing activity is that the response time must be three seconds or less. To achieve the required response time of less than three seconds, the load distribution server 104 is configured to enable load balancing and to distribute loads among the network of the video processing node 102, and first through third external processing nodes 103a till 103c, considering network characteristics, node usage and network failures.

Figure 3A:
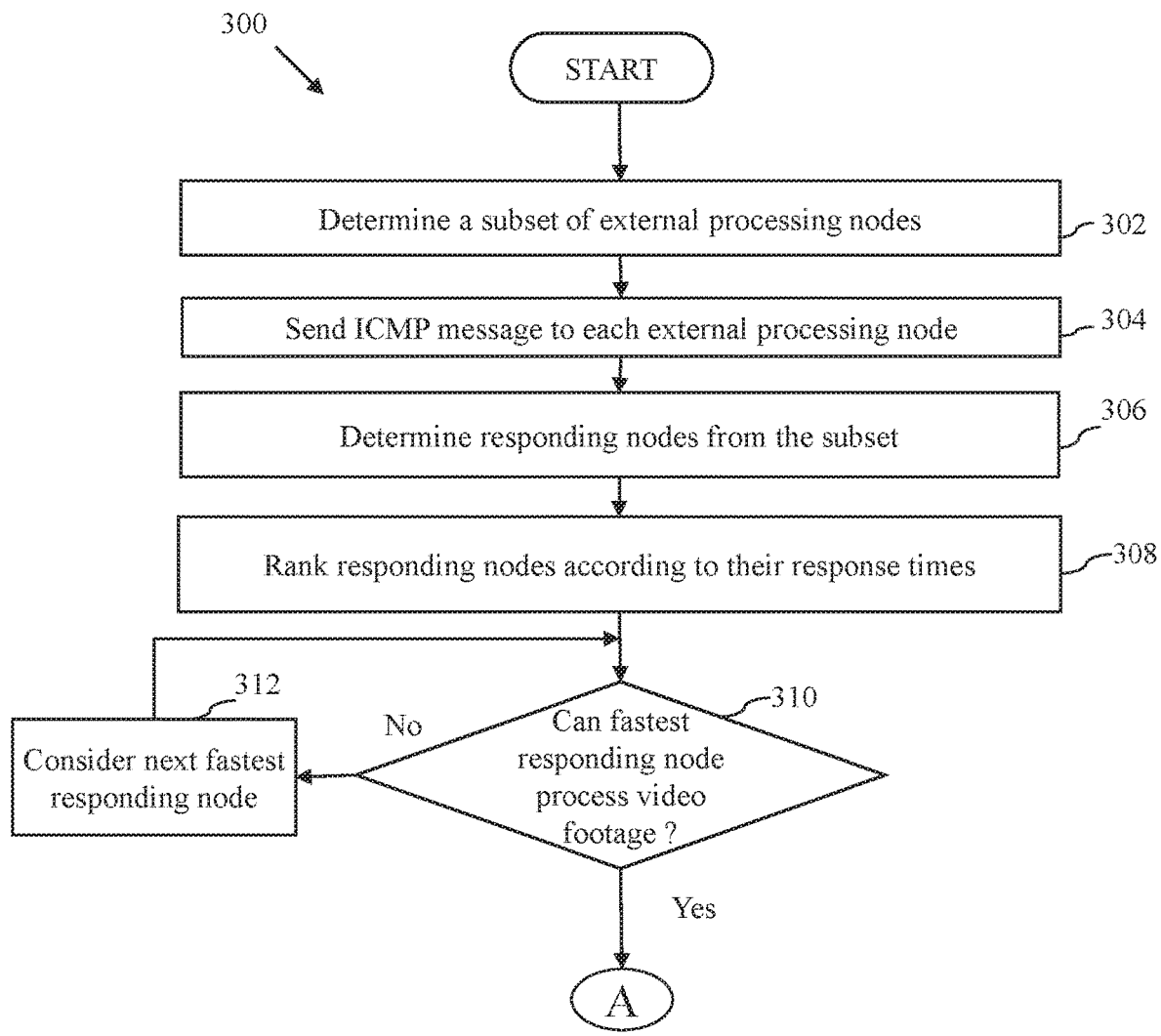
FIGS. 3A and 3B are a flowchart illustrating a method of load distribution using smart traffic control implementation in a network of processing nodes, in accordance with an embodiment of the present disclosure.
Figure 3B:
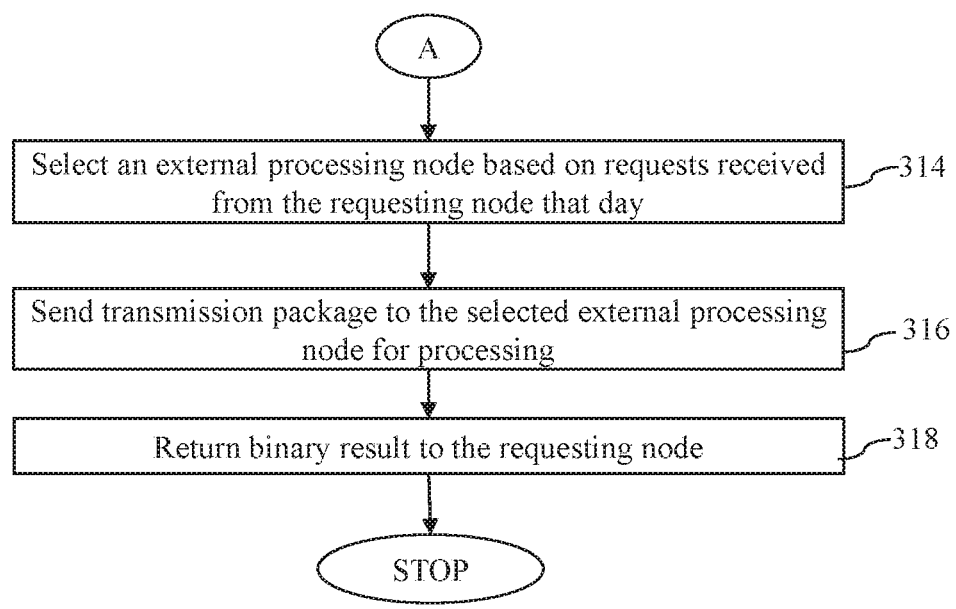

In an embodiment of the present disclosure, there are at least two possible practical implementations of the invention, namely basic implementation and a smart traffic control implementation. According to the basic implementation, a requesting node such as the video processing node 102 includes a hard-coded list of the IP addresses of the most geographically proximal external processing nodes. The video processing node 102 transmits the transmission package to the most proximal external processing node and awaits a response denoting the detection or not of ticket switching activity. While possessing the advantage of engineering simplicity, the basic implementation is not sensitive to the traffic load within the network nor does it address the problem of network fragility (to provide failover protection). The smart traffic control implementation has been explained in detail with reference to FIGS. 3A and 3B.

Although, the detailed structure of the first through third external processing nodes 103a till 103c and the load distribution server 104 has not been shown, it would be apparent to one of ordinary skill in the art, that each may include a processor and memory, similar to that of the video processing node 102.

Further, although only one video processing node 102, and three external processing nodes 103a till 103c are shown for the sake of brevity, it would be apparent to one of ordinary skill in the art that these numbers may vary.

Figure 2:
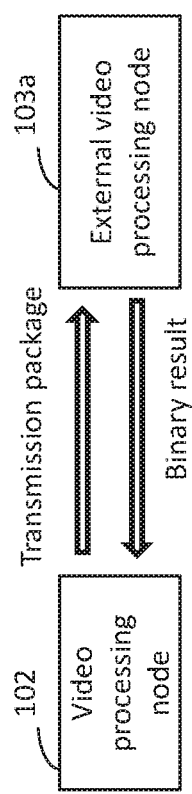
FIG. 2 illustrate load sharing between a video processing node, and an external processing node, in accordance with an embodiment of the present disclosure.

FIG. 2 illustrates load sharing between a video processing node 102, and the first external processing node 103a, in accordance with an embodiment of the present disclosure. The requesting node such as the video processing node 102 sends a transmission package to the first external processing mode 103a for processing. The transmission package comprises an item of recorded video footage and a payload comprising the known Universal Product Code (UPC) of the relevant product. The recorded video footage is a set of video frames captured at a certain resolution (e.g. High Definition (HD) or Full High Definition (FHD)) by the camera during the scanning process. The UPC is the text information representing a retailer product code (e.g. '042100005264').

The first external processing mode 103a processes the recorded video footage based on an appropriate ML algorithm and returns a binary result to the video processing node 102. In an example, a binary result '1' indicates that the ticket switching activity was detected in the recorded video footage, whereas a binary result '0' indicates that no ticket switching activity was detected in the recorded video footage. In an embodiment of the present disclosure, multiple ML models are trained to process recorded video footage (or images therefrom). Each ML model may be any Convolutional Neural Network (CNN) based model able to classify a product image into one or more pre-defined classes. The video processing node 102 may decide which ML to be used based on the Universal Product Code (UPC) of the product in the recorded video footage.

FIG. 3 is a flowchart illustrating a method 300 of load distribution using smart traffic control implementation in a network of processing nodes, in accordance with an embodiment of the present disclosure. Some steps may be discussed with respect to the system as shown in FIG. 1.

At step 302, the load distribution server 104 may determine a subset of external processing nodes for a requesting node (also known as originator node) from a predefined set of external processing nodes. In an embodiment of the present disclosure, the video processing node 102 may be the requesting node and the requesting node may be hereinafter referred to the requesting node 102, and the subset includes first, second and third external processing nodes 103a till 103c. Further, the subset may be of a predefined size. For brevity, the determined subset is hereinafter referred to as "external processor pool." The external processor pool comprises the most proximal external processing nodes to the video processing node 102. In an example, if there are 20 external processing nodes, 6 of which are proximal to the video processing node 102, then the external processor pool may include those 6 external processing nodes. In the context of the present disclosure, the external processor pool is manually configured when the system is designed and installed, and need not have a direct connection with the camera 101.

At step 304, the requesting node 102 sends an ICMP message to each external processing node 103a till 103c of the external processor pool. In response, the requesting node 102 receives responses from each of the external processing nodes 103a till 103c. The ICMP messages are widely used in computer networking to verify basic communication parameters with a remote computer. The protocol can be extended so that the exchanged messages contain extra information such as the current load on the external processing nodes.

At step 306, the load distribution server 104 selects one or more responding nodes, based on their response time to the requesting node 102. In an embodiment of the present disclosure, the external processing nodes which do not respond to the requesting node within a required time interval are referred to as "non-responding nodes." The non-responding node may be non-responsive or blocked because of a network problem. Similarly, the external processing nodes that do respond to the requesting node within the required time interval are hereinafter referred to as "responding nodes." In an example, out of 6 external processing nodes of the subset selected at step 302, three external processing nodes may be determined to be responding, whereas three external processing nodes may be determined to be non-responding. In the context of the present disclosure, the time interval threshold for the selection step 306, may be pre-configured during a system installation phase after load testing of the processing network. In an example, the time interval threshold may be 1 second.

At step 308, the load distribution server 104 ranks the responding nodes according to their response times. In an example, the first external processing node 103a may be ranked first with the shortest response time, the third external processing node 103c may be ranked second, and the second external processing node 103b may be ranked third. In an embodiment of the present disclosure, identifiers (IP addresses) of non-responding nodes are also determined. The load distribution server 104 has a static list of IP addresses (identifiers), and a process does not exist for dynamically finding the IP addresses of external processing nodes.

At step 310, the load distribution server 104 may enquire whether the fastest responding node such as the first external processing node 103a can process recorded video footage from the requesting node 102. In an embodiment of the present disclosure, the ICMP responses from each external processing node can be customized with current time performance metrics such as CPU and/or GPU usage. If the usage of an external processing node exceeds a certain threshold value (e.g. 80%), that external processing node is deemed to be under heavy load. Thus, the external processing node in question cannot process the recorded video footage.

At step 312, the load distribution server 104 enquires of a next responding node, (i.e. the second ranked responding node) whether it can process the recorded video footage, when the first ranked responding node cannot process the recorded video footage. In an embodiment of the present disclosure, the load distribution server 104 continues enquiring the remaining responding nodes, until it receives a positive response from a responding node.

At step 314, the load distribution server 104 identifies a most suitable external processing node based on requests received from the requesting node 102 on a predefined day. The requests may be assessed by assessing periodic computational load profiles of the corresponding external processing node. In an embodiment of the present disclosure, histograms may be established that show the daily computational load profile of each external processing node within the external processor pool, from a historical analysis of traffic within individual retail stores. For instance, stores in different locations may exhibit different patterns of business, for example, a store in a tourist zone may exhibit a relatively flat/unchanging business profile, whereas a store within a shopping mall may exhibit peaks and troughs of businesses corresponding with normal office business hours or school hours when customers are more or less available to do their shopping. Similarly, geographically proximal stores may nevertheless be in different time zones, if the stores are close to the borders of the individual time zones. Thus, it is possible for stores to exhibit business time profiles shifted by an hour. The load distribution server 104 identifies the most suitable external processing node using historical analysis of traffic from previous years for a specific day (e.g. implementing smart traffic) or using the recent load pattern by analyzing responses from the current day.

In another embodiment of the present disclosure, using its internal clock, the requesting node 102 may interrogate its own records to identify those responding nodes whose computational load has exceeded a first threshold value $Th_1$ during a predefined time interval. When the computational load exceeds the first threshold value $Th_1$, the requesting node 102 does not send recorded video footage for processing during the predefined time interval. In an embodiment of the present disclosure, the responding nodes whose computational load exceeds the first threshold value during the predefined time interval are hereinafter referred to as "Anticipated Load excluded external nodes." In the context of the present disclosure, the "Anticipated Load excluded external nodes" may be hereinafter also referred to as a first set of excluded nodes.

In yet another embodiment of the present disclosure, the requesting node 102 may retain a historical record of the external processing nodes to which it has previously sent video processing requests that day. If the number of video processing requests sent within the immediately preceding time interval by the requesting node to a given external processing node exceeds a second threshold value, the corresponding external processor node is removed from the external processor pool. For brevity, the removed nodes may be hereinafter referred to as "Previous usage excluded external processing nodes." In the context of the present disclosure, the "Previous usage excluded external nodes" may be hereinafter also referred to as a second set of excluded nodes.

In an example, the load distribution server 104 identifies the first external video processing node 103a as most suitable external processing node for the requesting node 102 using a predefined rule. The predefined rule includes identifying the fastest responding external processing node which is neither an anticipated load excluded node, nor a previous usage excluded external node.

At step 316, the requesting node 102 sends a transmission package to the identified first external processing node 103a for processing. The transmission package comprises an item of recorded video footage and payload comprising the known barcode of the relevant product. The first external processing node 103a processes the video footage based on an appropriate ML model. An example of the ML model is Convolutional Neural Network (CNN). The processing of the video footage means inferencing the video footage through the ML model. The inferencing is process in which the input is consumed by the ML model in order to produce the output, in this case, the decision as to whether a ticket switch is detected in the recorded video footage or not.

At step 318, a binary result is returned to the requesting node 102. In an example, a binary result '1' indicates that the ticket switching activity is detected in the recorded video footage, whereas a binary result '0' indicates that no ticket switching activity was detected in the recorded video footage.

An advantage of the smart traffic control implementation includes its robustness to failures within the network and its capacity to re-route video processing requests (i.e. transmission packages) accordingly. A further advantage of the smart traffic control implementation includes its robustness and adaptability to variability and anticipated variability in computational load on a given external processing node arising from business activity within the relevant host store at a given time of the day.

As will be appreciated by those ordinary skilled in the art, the method steps may be implemented by suitable code on a processor base system, such as general purpose or special purpose computer (i.e., machine). It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible non-transitory machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for distributing load in a network of processing nodes, wherein the network includes a requesting node, and a set of external processing nodes, the method comprising:
sending an Internet Control Message Protocol (ICMP) message to each external processing node;
classifying each external processing node as being either a responding or a non-responding node based on a corresponding response time of each ICMP message;
identifying a responding node that has the capability to fulfill a video processing request submitted by the requesting node;
determining a first set of excluded responding nodes, wherein a computational load on each excluded responding node of the first set during a first pre-defined time interval exceeds a first threshold;
determining a second set of excluded responding nodes, wherein a number of video processing requests received by each excluded responding node of the second set from the requesting node during a preceding time interval exceeds a second threshold;
selecting an identified node for fulfilling the video processing request, wherein the identified node does not form a part of the first and second sets of excluded responding nodes;
sending a transmission package from the requesting node to the selected identified node for processing; and
receiving a binary response from the selected identified node.

2. The method of claim 1, wherein one or more of the set of external processing nodes are determined based on their proximity to the requesting node.

3. The method of claim 1, wherein the transmission package comprises a recorded video footage and a payload comprising a known barcode of an associated product.

4. The method of claim 3, wherein the binary response includes a binary result, wherein the binary result '1' indicates the presence of ticket switching activity in the recorded video footage, and the binary result '0' indicates the absence of ticket switching activity in the recorded video footage.

5. The method of claim 1, wherein each responding node responds to the ICMP message of the requesting node within a second pre-defined time interval.

6. The method of claim 1 further comprising recording IP addresses of one or more non-responding nodes.

7. The method of claim 1, wherein the step of identifying the responding node comprises the steps of:

ranking the one or more responding nodes based on corresponding response times;
enquiring whether the first ranked node has a capability to process the video footage; and
continuing enquiring of a next ranked node when a previously ranked node does not have the capability to process the video footage.

8. The method of claim 1, wherein the transmission package is processed at the selected node using a convolutional neural network (CNN).

9. A system comprising:
a camera configured to record a video footage;
a requesting node communicatively coupled to the camera and configured to receive the video footage for processing;
a set of external processing nodes communicatively coupled to the requesting node; and
a load distribution server communicatively coupled to the requesting node and the set of external processing nodes and comprising a processor, wherein the processor is configured to:
send an Internet Control Message Protocol (ICMP) message to each external processing node;
classify each external processing node as being either a responding or a non-responding node based on corresponding response time of each ICMP message;
identify a responding node that has the capability to fulfill a video processing request submitted by the requesting node;
determine a first set of excluded responding nodes, wherein the computational load on each excluded responding node of the first set during a first pre-defined time interval exceeds a first threshold;
determine a second set of excluded responding nodes, wherein a number of video processing requests received by each excluded responding node of the second set from the requesting node during a preceding time interval exceeds a second threshold;
select an identified node for fulfilling the video processing request, wherein the identified node does not form a part of the first and second sets of excluded responding nodes;
send a transmission package to the selected identified node for processing; and
receive and transmit a binary response to the requesting node.

10. The system of claim 9, wherein one or more of the set of external processing nodes are determined based on their proximity to the requesting node.

11. The system of claim 9, wherein the transmission package comprises a recorded video footage and a payload comprising a known barcode of an associated product.

12. The system of claim 11, wherein the binary response includes a binary result, and wherein a binary result '1' indicates the presence of ticket switching activity in the recorded video footage, and wherein a binary result '0' indicates the absence of ticket switching activity in the recorded video footage.

13. The system of claim 9, wherein each responding node responds to the ICMP message of the requesting node within a second pre-defined time interval.

14. The system of claim 9, wherein the processor is further configured to record IP addresses of one or more non-responding nodes.

15. The system of claim 9, wherein the processor is further configured to:

rank the one or more responding nodes based on corresponding response times;
enquire whether the first ranked node has a capability to process the video footage; and
continue enquiring of a next ranked node when a previously ranked node does not have the capability to process the video footage.

16. The system of claim 9, wherein the transmission package is processed at the selected node using a convolutional neural network (CNN).

17. A non-transitory computer readable medium configured to store a program causing a computer to distribute load in a network of processing nodes, wherein the network includes a requesting node, and a set of external processing nodes, said program configured to:
  send an Internet Control Message Protocol (ICMP) message to each external processing node;
  classify each external processing node as being either a responding or a non-responding node based on corresponding response time of each ICMP message;
  identify a responding node that has the capability to fulfill a video processing request submitted by the requesting node;
  determine a first set of excluded responding nodes, wherein the computational load on each excluded responding node of the first set during a first predefined time interval exceeds a first threshold;
  determine a second set of excluded responding nodes, wherein a number of video processing requests received by each excluded responding node of the second set from the requesting node during a preceding time interval exceeds a second threshold;
  select an identified node for fulfilling the video processing request, wherein the identified node does not form a part of the first and second sets of excluded responding nodes;
  send a transmission package to the selected identified node for processing; and
  receive and transmit a binary response to the requesting node.

18. The non-transitory computer readable medium of claim 17, wherein the transmission package comprises a recorded video footage and a payload comprising a known barcode of an associated product.

19. The non-transitory computer readable medium of claim 17, wherein the binary response includes a binary result, and wherein a binary result '1' indicates presence of ticket switching activity in the recorded video footage, and wherein a binary result '0' indicates absence of ticket switching activity in the recorded video footage.

20. The non-transitory computer readable medium of claim 17, wherein the program is further configured to:
  rank the one or more responding nodes based on corresponding response times;
  enquire whether the first ranked node has a capability to process the video footage; and
  continue enquiring of a next ranked node when a previously ranked node does not have the capability to process the video footage.

* * * * *